Sept. 30, 1941.    H. L. EASTUS    2,257,675
PLUNGER SCREW-OUT CHUCK
Filed Jan. 23, 1940
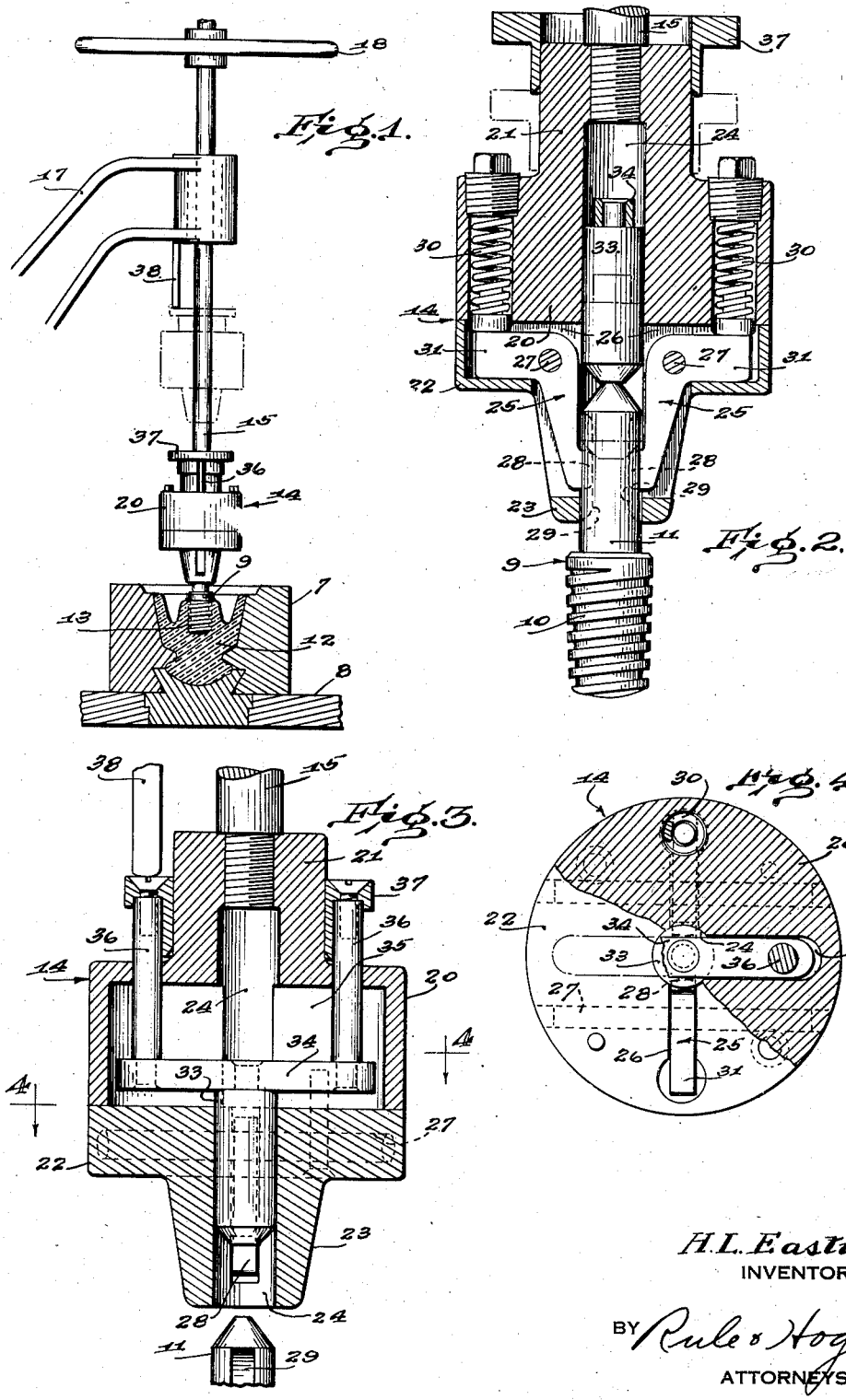
H. L. Eastus
INVENTOR
BY Rule & Hoge
ATTORNEYS Patented Sept. 30, 1941

2,257,675

UNITED STATES PATENT OFFICE 2,257,675

PLUNGER SCREW-OUT CHUCK

Harold L. Eastus, Muncie, Ind., assignor to Owens-Illinois Glass Company, a corporation of Ohio Application January 23, 1940, Serial No. 315,212

3 Claims. (Cl. 279—24)

The present invention relates to improved mechanism for removing screw plungers from pressed articles such as glass insulators or the like.

In the manufacture of molded glass insulators having screw threads formed therein, it is the usual practice to insert a screw threaded plunger tip in the pressing head of the forming machine. As the head is pressed into the mold, the glass flows around the tip and the threads are thus formed therein. The plunger tip is then disconnected from the press head as the latter is raised from the mold. The table carrying the mold indexes to the next station and another plunger tip is inserted in the press head in readiness for the next pressing operation. The glass in the mold is permitted to chill or harden around the plunger during the indexing interval but the internal temperature being relatively high, maintains the glass for a time in a semi-plastic state. Great care must be exercised in unthreading the tip to prevent mutilating the threads and also destroying the axial alignment of the threaded cavity and the insulator body.

Various methods of removing the plunger tips have been employed, one of which comprises a vertical rod supported over the mold and having a clamp for grasping the shank of the plunger. As the rod is rotated, the tip is screwed out, but unless the mechanism is accurately constructed and carefully handled, the plunger may wobble and produce a cavity which is out of round or otherwise imperfect. The removed plunger tips are allowed to cool for a time before being used again in the press heads. It is an object of this invention to provide a novel chuck for grasping and rigidly holding the plunger as it is unthreaded from the glass.

Another object of the invention is the provision of a chuck of simple construction which will automatically grasp the plunger for removing it from the mold and automatically release it at a predetermined time following removal from the mold.

A further object of the invention is the provision of a chuck which will readily and easily grasp the shank of plunger and hold it securely against eccentric motion or wobbling.

Other objects will be in part apparent and in part pointed out hereinafter.

In the drawing:

Fig. 1 is an elevational view of apparatus embodying my invention which is shown in operating position.

Fig. 2 is a vertical sectional view through the device.

Fig. 3 is a similar view taken at right angles to the showing in Fig. 2.

Fig. 4 is a horizontal sectional view taken substantially on line 4—4 of Fig. 3.

Fig. 1 of the drawing illustrates conventionally an insulator mold 7 mounted on a plate 8 or base, which may be the mold supporting platform of a suitable pressing machine of the type usually employed for pressing glass articles. Reference may be had to Patent No. 1,193,787 to M. K. Holmes for a detailed description of such a machine. Generally, the molding of the article includes placing a charge of glass in an open mold which is then indexed to a pressing station where a stripping ring is seated on the mold prior to pressing the glass. A plunger tip 9 provided with screw threads 10 has a shank 11 by which it is removably attached to the pressing head (not shown) of the machine. The head carrying the plunger is lowered for cooperation with the mold and displaces a portion of the glass therein to completely fill the cavity and form an insulator 12 under relatively heavy pressure. When the pressing operation is completed the plunger tip 9 is disconnected from the press head and allowed to remain in the glass throughout a portion of the manufacturing cycle and while the mold table is indexed through succeeding stations.

When the glass has chilled and set sufficiently around the plunger, the tip is removed by unscrewing it from the cavity 13 formed thereby. In order to prevent deforming the cavity when removing the tip, mechanism is employed which includes a plunger holding chuck 14 carried on the lower end of a vertically disposed rod 15. The rod is slidably and rotatively mounted in a stationary bracket 17 carried by the forming machine to support the weight of the chuck and permit easily controlled up and down movement thereof as shown in the Holmes patent. A hand wheel 18 on the rod may be employed to manually rotate the chuck during its operation. The chuck is supported in axial alignment with the plunger at the tip removing station.

The chuck 14 comprises a cylindrical body 20 having an upwardly extending boss 21 or guide into which the lower end of the rod 15 is threaded. A plunger receiver 22 or holder is bolted to the lower surface of the body 20 and has a downwardly tapering axially positioned nose portion 23 adapted to closely approach the mold when engaging the plunger. The body and nose are provided with an axial bore 24 which is substantially the diameter of the shank 11 of the plunger and into which it is received. Substantially inverted L-shaped plunger latches 25 are pivoted within diametrically opposed recesses 26 formed in the nose on horizontal pins 27, the downwardly extending portions thereof having fingers 28 adapted to engage in a pair of grooves 29 formed in the shank 11 of the plunger. The upper end wall of each groove is curved to facilitate removal of the latches from engagement therewith. The latches are held in operative position under tension of coil springs 30 which are mounted within the body 20 and bear against the outwardly extending upper ends 31 of the latches 25. The plunger is thus securely held within the chuck and is prevented from slipping or wobbling while being withdrawn from the glass.

A plunger ejector pin 33, which operates to release the plunger tip at a predetermined point above the molds, is vertically movable within the upper end of the bore 24 and is secured to a yoke bar 34 which is disposed at right angles to the pin 33. The yoke bar is mounted for vertical movement in a vertical guideway 35 in the body member. An upwardly extending guide rod 36 is fixed to each end of the bar 34 and projects through openings in the body. At their upper ends, the rods 36 are attached to a flanged collar 37 which is slidably mounted on the boss 21. A plunger held within the chuck is automatically removed as the chuck is raised to a predetermined point by the rod 15. A plunger releasing rod 38 carried by the bracket 17 engages the collar 37 as the chuck moves upward, and thereby effects relative vertical movement between the collar and pin 33 for forcing the plunger from engagement with the latches 25.

In operation, the forming machine is periodically indexed as hereinbefore stated to bring the molds in succession to the several stations. The mechanism herein described is disposed at one of said stations located substantially 180° from the forming station. As a mold bearing the formed article with the plunger held upright therein reaches the plunger removing station, the chuck is lowered relative thereto so that the tapered end of the plunger shank 11 enters the bore 24. Continued downward movement and rotation of the chuck by the hand wheel 18 permits the projections 28 on the latch members to snap into the grooves 29 under pressure of the coil springs 30 and securely grasp and hold the plunger. Upon further rotation of the hand wheel, the chuck is backed away from the mold, thereby unthreading the plunger from the cavity formed by it in the glass.

After the plunger has been entirely freed from the glass, the apparatus may be raised without further rotation to the plunger releasing position. As the chuck approaches the limit of its upward movement, the collar 37 engages the rod 38 and is actuated thereby to release the plunger which is taken by a waiting operator and placed in a suitable holder for use in another mold.

Modifications may be resorted to within the spirit and scope of the appended claims.

I claim:

1. In apparatus of the character described, a chuck having a central vertical bore therethrough and provided with a pair of diametrically opposed slots in the lower portion thereof and with a transverse axially disposed guideway above said slots, an axial guide extending upwardly from the chuck, said slots and guideway being arranged at a right angle to each other, a pair of inverted L-shaped pivoted latches arranged in said slots and having fingers normally projecting into the bore, spring means applying top pressure to the latches for yieldingly holding the fingers so projected, an ejector pin positioned in the bore and projecting downwardly between said fingers, a cross bar mounted in said guideways above the ejector pin, a collar slidably mounted upon the guide for axial movement thereupon, and means operatively connecting the collar and cross bar.

2. In apparatus of the character described, a chuck having a central vertical bore therethrough and provided with a pair of diametrically opposed slots in the lower portion thereof and with a transverse axially disposed guideway above said slots, an axially positioned guide rising from the chuck, said pair of slots and guideway being arranged at a right angle to each other, a pair of pivoted latches arranged in said slots and having fingers normally projecting into the bore, spring means for yieldingly holding the fingers so projected, an ejector pin positioned in the bore and projecting downwardly between said fingers, a cross bar mounted in said guideways, a collar slidably mounted upon the guide for axial movement thereupon, means operatively connecting the collar and cross bar, each of said latches being substantially L-shaped and including a horizontal arm at its upper end extending radially outward, and a spring device positioned to apply downward pressure to the outer end of said arm.

3. In combination, a chuck having a vertical central bore opening through the lower end thereof and into which the shank of a plunger is adapted to project, said chuck also having a pair of diametrically opposed longitudinal slots opening into said bore and a pair of opposed horizontal guideways extending transversely of the chuck above and at right angles to the slots, said chuck having vertical openings extending upwardly from each end of the guideway, an axially disposed guide rising from the chuck, a pair of inverted L-shaped latches pivotally mounted in said slots and having fingers normally projecting into the bore for engagement with the shank of the plunger, springs individual to the latches yieldingly holding said fingers in engagement with the shank, an ejector pin in the bore and in part between said latches, a cross bar slidingly mounted in the guideways and connected to the ejector pin, guide rods secured to the ends of said cross bar and extending upwardly through said vertical openings and a collar connected to the rods and slidingly mounted upon the aforementioned guide.

HAROLD L. EASTUS.